United States Patent
Kim et al.

(10) Patent No.: US 12,116,020 B2
(45) Date of Patent: Oct. 15, 2024

(54) VEHICLE FOR DISABLING AUTONOMOUS DRIVING AND METHOD OF CONTROLLING THE SAME

(71) Applicants: Hyundai Motor Company, Seoul (KR); Kia Corporation, Seoul (KR)

(72) Inventors: Eungseo Kim, Gyeonggi-do (KR); Yongseok Kwon, Gyeonggi-do (KR); Tae-Geun An, Gyeongsangbuk-do (KR); Dong Hyun Sung, Gyeonggi-do (KR); Sangmin Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 324 days.

(21) Appl. No.: 17/669,747

(22) Filed: Feb. 11, 2022

(65) Prior Publication Data

US 2023/0093168 A1    Mar. 23, 2023

(30) Foreign Application Priority Data

Sep. 17, 2021  (KR) .................. 10-2021-0124915

(51) Int. Cl.
  *B60W 60/00*   (2020.01)
  *B60W 10/20*   (2006.01)
  (Continued)

(52) U.S. Cl.
  CPC ........ *B60W 60/0053* (2020.02); *B60W 10/20* (2013.01); *B60W 40/105* (2013.01);
  (Continued)

(58) Field of Classification Search
  CPC ............. B60W 60/0053; B60W 10/20; B60W 40/105; B60W 50/082; B60W 2050/0025;
  (Continued)

(56) References Cited

U.S. PATENT DOCUMENTS 8,942,904 B2 * 1/2015 Foerster .................. G08G 1/16
  477/182
10,099,688 B2 * 10/2018 Taki ...................... B60W 10/20

FOREIGN PATENT DOCUMENTS

CN          113771843 A  * 12/2021

OTHER PUBLICATIONS

For CN Reference.*

* cited by examiner

*Primary Examiner* — Brian P Sweeney
(74) *Attorney, Agent, or Firm* — Fox Rothschild LLP

(57) ABSTRACT

A vehicle is capable of disabling autonomous driving by identifying whether an intervention of a user has occurred during autonomous driving. The vehicle includes a steering wheel, a first sensor device configured to detect a steering torque of the steering wheel, a steering angle of the steering wheel, and a steering angular velocity of the steering wheel, and a second sensor device configured to detect a touch of a user applied to the steering wheel. When the vehicle travels in an emergency control state in which a deceleration/acceleration speed of the vehicle is greater than a predetermined first value during autonomous driving, if the touch of the user on the steering wheel is detected through the second sensor device, the emergency control state is disabled under certain conditions, and if the steering torque is greater than or equal to a predetermined torque value, autonomous driving is disabled.

16 Claims, 6 Drawing Sheets

(51) Int. Cl.
  *B60W 40/105* (2012.01)
  *B60W 50/08* (2020.01)
  *B62D 1/04* (2006.01)
  *B62D 6/10* (2006.01)
  *G06V 20/56* (2022.01)
  *B60W 50/00* (2006.01)
(52) U.S. Cl.
  CPC ........... *B60W 50/082* (2013.01); *B62D 1/046* (2013.01); *B62D 6/10* (2013.01); *G06V 20/588* (2022.01); *B60W 2050/0025* (2013.01); *B60W 2420/403* (2013.01); *B60W 2510/202* (2013.01); *B60W 2510/205* (2013.01); *B60W 2540/18* (2013.01); *B60W 2552/53* (2020.02); *B60W 2554/80* (2020.02)
(58) Field of Classification Search
  CPC ..... B60W 2420/403; B60W 2510/202; B60W 2510/205; B60W 2540/18; B60W 2552/53; B60W 2554/80; B60W 2554/802; B62D 1/046; B62D 6/10; B62D 15/025; B62D 1/286; G06V 20/588
  See application file for complete search history.

VEHICLE FOR DISABLING AUTONOMOUS DRIVING AND METHOD OF CONTROLLING THE SAME

CROSS-REFERENCE TO RELATED APPLICATION

This application claims under 35 U.S.C. § 119 the benefit of Korean Patent Application No. 10-2021-0124915, filed on Sep. 17, 2021 in the Korean Intellectual Property Office, the entire contents of which are incorporated herein by reference.

BACKGROUND

1. Technical Field

The present disclosure relates to a vehicle for disabling autonomous driving by identifying whether an intervention of a user has occurred during autonomous driving, and a method of controlling the same.

2. Description of the Related Art

Recently, research has been conducted on vehicles that utilize autonomous driving, including an unmanned driving method that operates according to a command of an external server by communicating with the external server without requiring a driver inside the vehicle and a method that operates by an artificial intelligence (AI) computer equipped inside the vehicle.

In addition, as the number of vehicles using autonomous driving increases, autonomous driving related accidents are likely to more frequently occur. Autonomous driving refers to a case in which a person is not involved in driving, and accidents may occur without awareness of a user while the driver is not paying attention to driving or giving the vehicle complete control for a short time.

In this regard, research to prevent accidents during autonomous driving is being conducted. In particular, research on a criterion for giving control to a user in a dangerous situation and research on detecting a user's intervention to prevent an accident during autonomous driving are being conducted.

SUMMARY

The present disclosure provides a vehicle capable of disabling autonomous driving by identifying whether an intervention of a user has occurred through a steering torque, a steering angle, and a steering angular velocity of a steering wheel during autonomous driving, and a method of controlling the same.

Additional aspects of the disclosure will be set forth in part in the description which follows and, in part, will be obvious from the description, or may be learned by practice of the disclosure.

According to an aspect of the disclosure, there is provided a vehicle including: a steering wheel; a first sensor device configured to detect a steering torque of the steering wheel, a steering angle of the steering wheel, and a steering angular velocity of the steering wheel; a second sensor device configured to detect a touch of a user applied to the steering wheel; a driving device; and a controller configured to, while the vehicle travels in an emergency control state in which a deceleration/acceleration speed of the vehicle is greater than a predetermined first value with the driving device being controlled by autonomous driving, if the touch of the user on the steering wheel is detected through the second sensor device, assign a first weight to the steering angle changed by the user, assign a second weight to the steering angular velocity, and sum the steering angle assigned the first weight and the steering angular velocity assigned the second weight to determine a disabling value; if the disabling value is greater than or equal to a predetermined threshold value, disable the emergency control state, and if the steering torque changed by the user is greater than or equal to a predetermined torque value, identify that an intervention of the user has occurred; and if the intervention of the user is identified as having occurred, disable the autonomous driving.

The controller may be configured to, while the vehicle travels in a default state in which the deceleration/acceleration speed of the vehicle is less than the predetermined first value with the driving device being controlled by autonomous driving, if the steering torque changed by the user is greater than or equal to the predetermined torque value, identify that the intervention of the user has occurred, and disable the autonomous driving.

The vehicle may further include a third sensor device configured to acquire distance information from another vehicle, wherein the controller is configured to, while the vehicle travels in the default state, if a distance between the vehicle and the other vehicle is greater than or equal to a predetermined interval based on the distance information, and the steering torque changed by the user is greater than or equal to the predetermined torque value, identify that the intervention of the user has occurred, and disable the autonomous driving.

The vehicle may further include a camera configured to acquire a surrounding image of the vehicle, wherein the controller is configured to determine side lane lines of the vehicle based on the surrounding image; and while the vehicle travels in the default state in the side lane lines, if the steering torque changed by the user is greater than or equal to the predetermined torque value, identify that the intervention of the user has occurred, and disable the autonomous driving.

The vehicle may further include an inputter configured to receive a command input by a user; wherein the controller is configured to set the first weight, the second weight, or the threshold value based on the command of the user being input through the inputter.

The vehicle may further include: a storage configured to store response information of the user and characteristic information of the vehicle, wherein the controller is configured to determine the first weight and the second weight based on the response information of the user and the characteristic information of the vehicle.

The controller may be configured to normalize the steering angle changed by the user and the steering angular velocity, and assign the first weight to the normalized steering angle, and assign the second weight to the normalized steering angular velocity.

The first weight and the second weight may be determined to have a sum equal to 1.

According to another aspect of the disclosure, there is provided a method of controlling a vehicle, the method including: detecting, by a first sensor device, a steering torque of the steering wheel, a steering angle of the steering wheel, and a steering angular velocity of a steering wheel; detecting, by a second sensor device, a touch of a user applied to the steering wheel; while the vehicle travels in an emergency control state in which a deceleration/acceleration speed of the vehicle is greater than a predetermined first value with a driving device being controlled by autonomous driving, if the touch of the user on the steering wheel is detected through the second sensor device, assigning a first weight to the steering angle changed by the user, assigning a second weight to the steering angular velocity, and summating the steering angle assigned the first weight and the steering angular velocity assigned the second weight to determine a disabling value; if the disabling value is greater than or equal to a predetermined threshold value, disabling the emergency control state, and if the steering torque changed by the user is greater than or equal to a predetermined torque value, identifying that an intervention of the user has occurred; and if the intervention of the user is identified as having occurred, disabling the autonomous driving.

The method may further include, while the vehicle travels in a default state in which the deceleration/acceleration speed of the vehicle is less than the predetermined first value with the driving device being controlled by autonomous driving, if the steering torque changed by the user is greater than or equal to the predetermined torque value, identifying that the intervention of the user has occurred, and disabling the autonomous driving.

The disabling of the autonomous driving may include, while the vehicle travels in the default state, if a distance between the vehicle and the other vehicle is greater than or equal to a predetermined interval based on distance information acquired through a third sensor device, and the steering torque changed by the user is greater than or equal to the predetermined torque value, identifying that the intervention of the user has occurred, and disabling the autonomous driving.

The disabling of the autonomous driving may include: determining side lane lines of the vehicle based on a surrounding image of the vehicle acquired through a camera; and while the vehicle travels in the default state in the side lane lines, if the steering torque changed by the user is greater than or equal to the predetermined torque value, identifying that the intervention of the user has occurred, and disabling the autonomous driving.

The method may further include setting the first weight, the second weight, or the threshold value based on a command of the user being input through an inputter.

The method may further include setting the first weight and the second weight based on response information of the user and characteristic information of the vehicle stored through the storage.

The assigning of the first weight to the steering angle changed by the user and the assigning of the second weight to the steering angular velocity may include normalizing the steering angle changed by the user and the steering angular velocity, and assigning the first weight to the normalized steering angle, and assigning the second weight to the normalized steering angular velocity.

The determining of the first weight and the second weight may include determining the first weight and the second weight to have a sum equal to 1.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
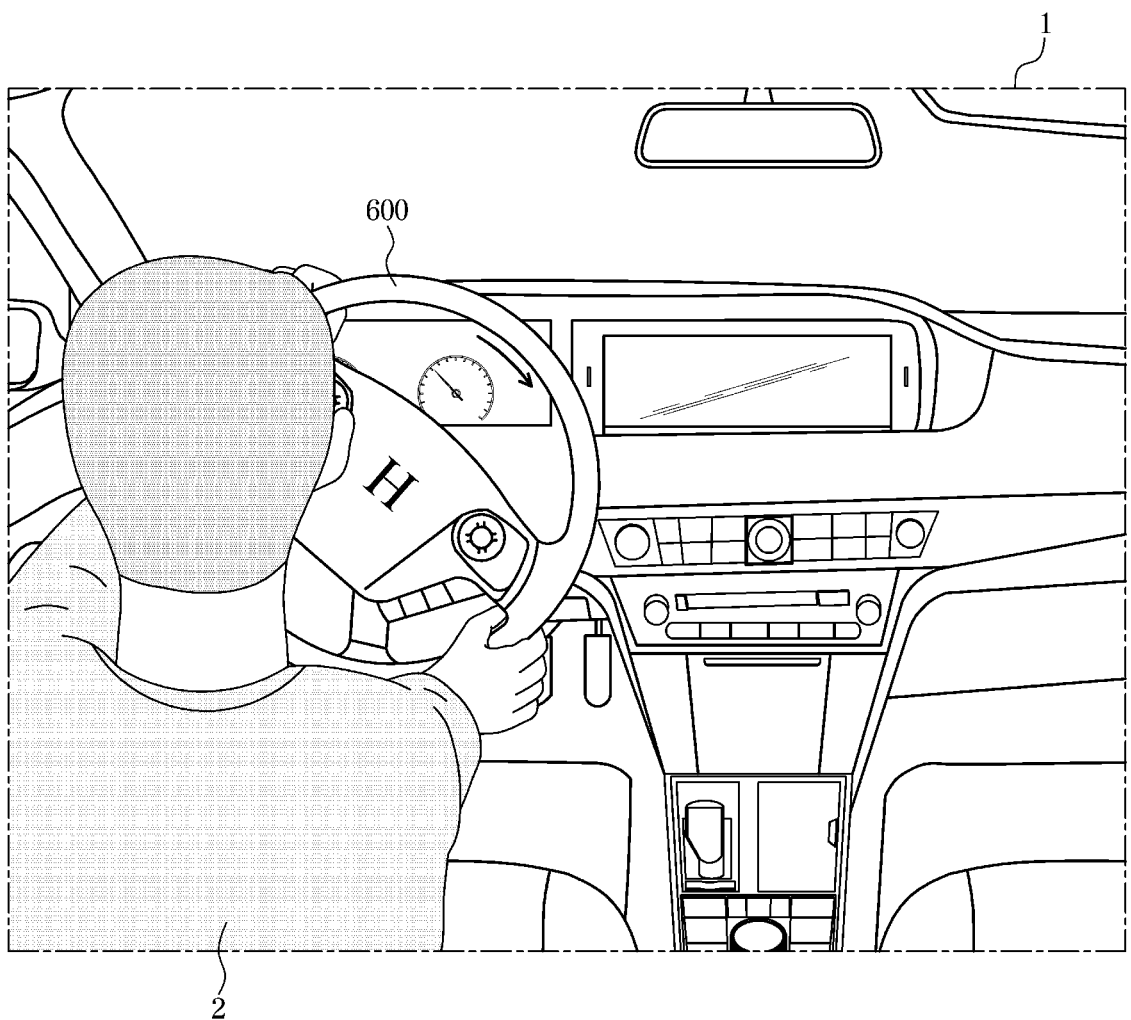
FIG. 1 is a diagram illustrating an operation in which a user rotates a steering wheel according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. The terminology used herein is for the purpose of describing particular embodiments only and is not intended to be limiting of the disclosure.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Like numerals refer to like elements throughout the specification. Not all elements of embodiments of the present disclosure will be described, and description of what are commonly known in the art or what overlap each other in the embodiments will be omitted. It will be further understood that the term "connect" or its derivatives refer both to direct and indirect connection, and the indirect connection includes a connection over a wireless communication network.

In the specification, it will be understood that, when a member is referred to as being "on/under" another member, it may be directly on/under the other member, or one or more intervening members may also be present.

Although the terms "first," "second," "A," "B," etc. may be used to describe various components, the terms do not limit the corresponding components, but are used only for the purpose of distinguishing one component from another component.

Reference numerals used for method steps are just used for convenience of explanation, but not to limit an order of the steps. Thus, unless the context clearly dictates otherwise, the written order may be practiced otherwise.

Hereinafter, the operating principles and embodiments of the disclosure will be described with reference to the accompanying drawings.

The controller may include a memory (not shown) for storing data regarding an algorithm for controlling the operations of the components of the vehicle or a program that represents the algorithm, and a processor (not shown) that performs the above described operations using the data stored in the memory. In this case, the memory and the processor may be implemented as separate chips. Alternatively, the memory and the processor may be implemented as a single chip.

Figure 2:
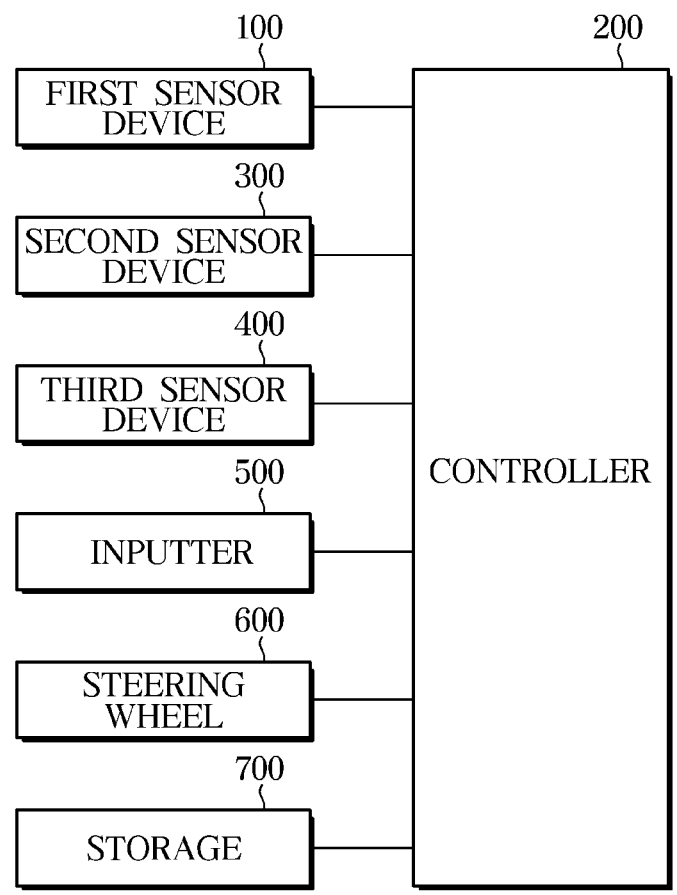
FIG. 2 is a control block diagram illustrating a vehicle according to an embodiment.

At least one component may be added or omitted to correspond to the performances of the components of the vehicle shown in FIGS. 1 and 2. In addition, the mutual positions of the components may be changed to correspond to the performance or structure of the system.

Meanwhile, some of the components shown in FIGS. 1 and 2 may refer to a software component and/or a hardware component, such as a Field Programmable Gate Array (FPGA) and an Application Specific Integrated Circuit (ASIC).

FIG. 1 is a diagram illustrating an operation in which a user 2 rotates a steering wheel 600 according to an embodiment.

Figure 3:
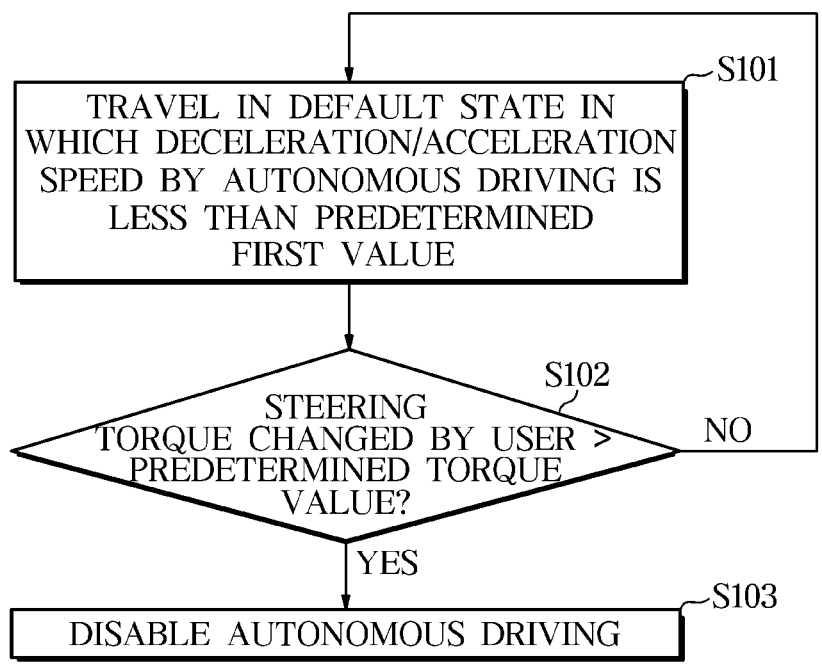
FIG. 3 is a flowchart illustrating an operation of disabling autonomous driving from a default state according to an embodiment.

FIG. 2 is a control block diagram illustrating a vehicle 1 according to an embodiment. FIG. 3 is a flowchart illustrating an operation of disabling autonomous driving from a default state according to an embodiment.

Referring to FIGS. 1 and 2, the vehicle 1 may include a steering wheel 600; a first sensor device 100 configured to detect a steering torque of the steering wheel 600, a steering angle of the steering wheel 600, and a steering angular velocity of the steering wheel 600; a second sensor device 300 configured to detect a touch of a user 2 applied to the steering wheel 600; a driving device; a controller 200 configured to, while the vehicle 1 travels in an emergency control state in which device a deceleration/acceleration speed of the vehicle 1 is greater than a predetermined first value with the driving device being controlled by autonomous driving, if a touch of the user 2 on the steering wheel 600 is detected through the second sensor device 300, assign a first weight to the steering angle changed by the user 2, assign a second weight to the steering angular velocity, and sum the steering angle assigned the first weight and the steering angular velocity assigned the second weight to determine a disabling value; if the disabling value is greater than or equal to a predetermined threshold value, disable the emergency control state, and if the steering torque changed by the user is greater than or equal to a predetermined torque value, identify that an intervention of the user has occurred; if the intervention of the user is identified as having occurred, disable the autonomous driving.

In addition, while the vehicle 1 travels in a default state in which the deceleration/acceleration speed of the vehicle 1 is less than the predetermined first value with the driving device being controlled by autonomous driving, if the steering torque changed by the user 2 is greater than or equal to the predetermined torque value, the controller 200 may identify that the intervention of the user 2 has occurred, and disable the autonomous driving.

The first sensor device 100 may include a torque and angle sensor. The torque and angle sensor may be a sensor in which a torque sensor and a steering angle sensor are modularized into one unit. Instead of the torque and angle sensor, a torque sensor (Torque Only Sensor; TOA) may be used. The torque and angle sensor may be electrically connected to an input side of the controller 200, and the controller 200 may output an electric actuator motor driving signal during steering control. The controller 200 may recognize the steering angle and the steering angular velocity of the steering wheel 600 based on a steering angle signal and a steering torque signal received from the torque and angle sensor. The controller 200 may identify whether the user 2 is intervening based on the steering angle, the steering angular velocity, the brake operation state, and the vehicle speed. The second sensor device 300 may refer to a touch sensor configured to detect a touch applied by the user 2 to the steering wheel 600.

During autonomous driving, disabling autonomous driving may lead to an accident due to negligence of the user 2. Therefore, it is necessary to be careful about disabling autonomous driving during autonomous driving. In particular, the risk of an accident may increase in case of an emergency control state (emergency maneuver) during autonomous driving. The emergency control state may refer to a state in which the vehicle 1 travels in a state in which a deceleration/acceleration speed of the vehicle 1 is greater than a predetermined first value with the driving device being controlled by autonomous driving. The predetermined first value may refer to a value set by the user 2 or in advance. While the vehicle 1 travels in the emergency control state, if the touch of the user 2 on the steering wheel 600 is detected through the second sensor device 300, the controller 200 may assign the first weight to the steering angle changed by the user 2, assign the second weight to the steering angular velocity, and sum the steering angle assigned the first weight and the steering angular velocity assigned the second weight to determine the disabling value. The disabling value may refer to a value required to disable the emergency control state. When the disabling value is greater than the threshold value, the controller 200 may disable the emergency control state. In addition, as will be described below, in order to set the steering angle and the steering angular velocity on the basis a single unit, the steering angle and the steering angular velocity may be regularized so as to be compared with the threshold value. Regularizing may represent normalizing. In this case, based on the steering angle and the steering angular velocity measured through the first sensor device 100 in practice, normalized, compared with the threshold value, whether the user 2 intervenes may be identified. In this case, the sum of the first weight and the second weight may be set to be equal to 1. For example, when the speed of the vehicle 1 is low, the threshold value may be set to be large, and when the speed of the vehicle 1 is high, the threshold value may be set to be small.

The reason for changing the threshold value according to the speed is to, when the vehicle 1 is traveling slowly, maintain the emergency control state in a case in which the user 2 slightly changes the steering angle or turns the steering wheel 600 slowly to change the steering angular speed slowly, and when the vehicle is travelling fast, to disable the emergency control state even if the steering angle and the steering angular speed are slightly changed. Thereafter, while the emergency control state is disabled, if the steering torque changed by the user 2 is equal to or greater than a predetermined torque value, it may be identified that an intervention of the user 2 has occurred. The predetermined torque value may refer to a change in torque that is great enough to identity that the user 2 intends to disable the autonomous driving, and may be set in advance. The occurrence of an intervention of the user 2 may refer to a case in which the user 2 has taken an action to disable the autonomous driving to drive the vehicle 1 by him/herself.

Referring to FIG. 3, while the vehicle 1 travels in a default state in which the deceleration/acceleration speed of the vehicle 1 is less than the predetermined first value with the driving device being controlled by autonomous driving (S101), it may be identified whether an intervention of the user has occurred based on whether the steering torque changed by the user 2 is greater than or equal to the predetermined torque value (S102) so that if the steering torque changed by the user 2 is greater than or equal to the predetermined torque value, the autonomous driving is disabled (S103), and if the steering torque changed by the user 2 is less than the predetermined torque value, the vehicle 1 may continue to travel in the default state. The default state may refer to a safe state in which the vehicle 1 does not need to change the speed urgently during autonomous driving.

In the default state, the operation of disabling the emergency control state may be omitted, but various conditions may be set by the user 2 as needed. In addition, the vehicle 1 may include an inputter 500, a storage 700, and a third sensor device 400. The inputter 500 may receive a command from the user 2. The inputter 500 may refer to various devices of the vehicle 1 that may receive a command from the user 2. The controller 200 may set the first weight, the second weight, or the predetermined threshold value based on the command of the user 2 received through the inputter 500. Setting the predetermined threshold value may refer to changing the predetermined threshold value to a different value according to a user's input even if the threshold value has been previously determined. This is to set a condition for disabling the autonomous driving, or for disabling the emergency control state by the user 2. The storage 700 may store response information of the user 2 and characteristic information of the vehicle 1. The response information of the user 2 may refer to driving pattern information of the user 2. The driving pattern information may include user information, such as a driving habit or driving tendency of the user 2 during autonomously driving or manual driving. The controller 200 may store various pieces of response information of the user 2, such as a driving pattern of the user 2, a driving tendency of the user 2, and a response of the driver when an accident occurs, through the storage 700. The characteristic information of the vehicle 1 may refer to function information of the vehicle 1 itself, and may refer to information about the vehicle 1, such as output response information of the vehicle 1 or the aging degree of the vehicle 1. The controller 200 may determine the first weight and the second weight based on the response information of the user 2 and the characteristic information of the vehicle 1.

The controller 200 may include a memory (not shown) for storing data regarding an algorithm for controlling the operations of the components of the vehicle 11 or a program that represents the algorithm, and a processor (not shown) that performs the above described operations using the data stored in the memory. In this case, the memory and the processor may be implemented as separate chips. Alternatively, the memory and the processor may be implemented as a single chip.

At least one component may be added or omitted to correspond to the performances of the components of the apparatus shown in FIGS. 1 and 2. In addition, the mutual positions of the components may be changed to correspond to the performance or structure of the system.

Meanwhile, some of the components shown in FIGS. 1 and 2 may refer to a software component and/or a hardware component, such as a Field Programmable Gate Array (FPGA) and an Application Specific Integrated Circuit (ASIC).

The storage 700 may include a nonvolatile memory device, such as a cache, a read only memory (ROM), a programmable ROM (PROM), an erasable programmable ROM (EPROM), an electrically erasable programmable ROM (EEPROM), and a flash memory, a volatile memory device, such as a random access memory (RAM), or other storage media, such as a hard disk drive (HDD), a CD-ROM, and the like, but the implementation of the storage 700 is not limited thereto. The storage 700 may be a memory implemented as a chip separated from the processor, which will be described below in connection with the controller 200, or may be implemented as a single chip integrated with the processor.

The inputter 500 may include a hardware device, such as various types of buttons or switches, pedals, keyboards, mouse, track-balls, various levers, handles, or sticks, to receive an input from a user.

In addition, the inputter 500 may include a graphical user interface (GUI), such as a touch pad, for a user input, that is, a software device, to receive an input from a user. The touch pad may be implemented as a touch screen panel (TSP) to form a mutual layer structure together with a display. In the case of the TSP forming a layer structure with the touch pad, the display may also be used as the inputter 500.

Figure 4:
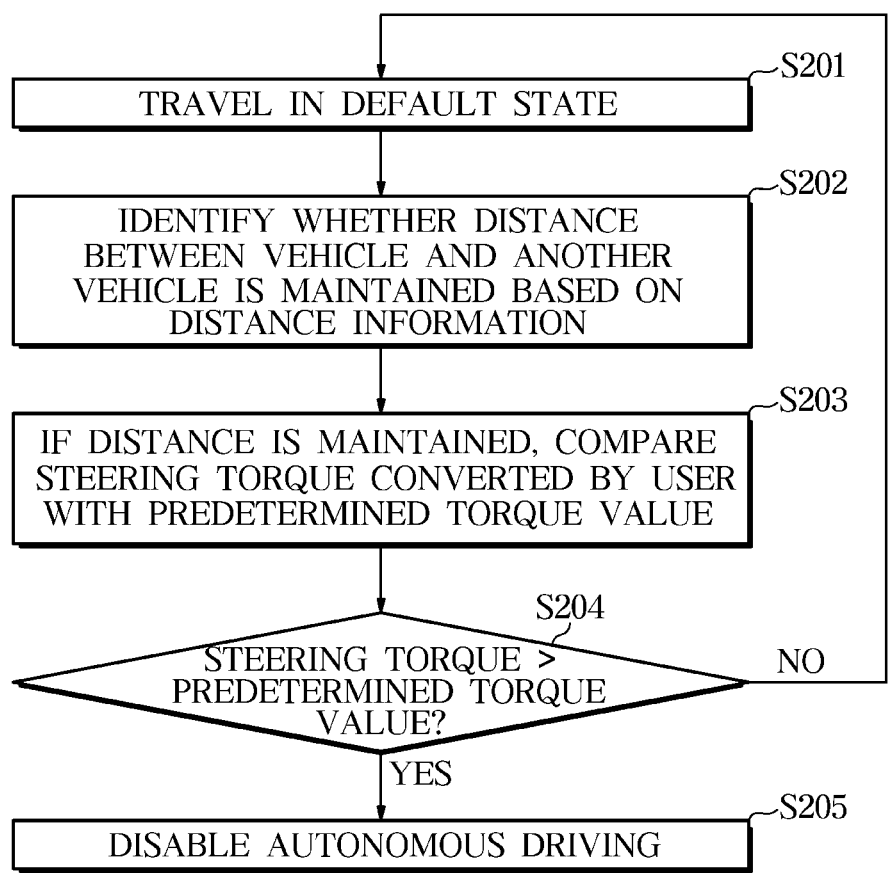
FIG. 4 is a flowchart illustrating an operation of disabling autonomous driving during a state in which a vehicle is travelling while maintaining a predetermined distance from another vehicle according to an embodiment.

FIG. 4 is a flowchart illustrating an operation of disabling autonomous driving during a state in which a vehicle is travelling while maintaining a predetermined distance from another vehicle according to an embodiment.

Referring specifically to FIG. 4, the vehicle 1 may further include a third sensor device configured to acquire distance information from another vehicle. The controller 200 is configured to, while the vehicle 1 travels in a default state (S201), identify whether the distance between the vehicle 1 and another vehicle is more than a predetermined interval, that is, whether the distance between the vehicle 1 and the other vehicle is maintained based on the distance information (S202), and if the distance is maintained, compare the steering torque changed by the user with the predetermined torque value (S203) to identify whether the steering torque is greater than the predetermined torque value (S204), and if the steering torque is greater than the predetermined torque value, disable the autonomous driving (S205), and if the steering torque is less than the predetermined torque value, continue to travel in the default state. That is, if the steering torque changed by the user is greater than or equal to the predetermined torque value, it is identified that an intervention of the user has occurred, and the autonomous driving may be disabled. The third sensor device may include a radar, a lidar, and the like. The predetermined interval may refer to a distance in which the vehicle 1 is less likely to collide with other nearby vehicles.

Figure 5:
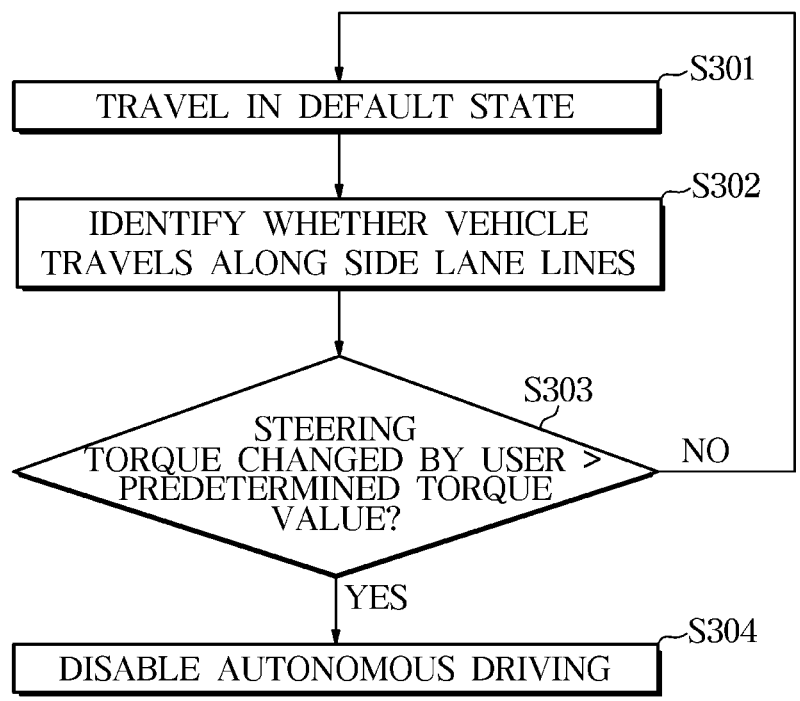
FIG. 5 is a flowchart illustrating an operation of disabling autonomous driving during a state in which a vehicle is travelling along a lane according to an embodiment.

FIG. 5 is a flowchart illustrating an operation of disabling autonomous driving during a state in which a vehicle is travelling along a lane according to an embodiment.

Referring to FIG. 5, the vehicle may further include a camera that acquires a surrounding image of the vehicle. The controller determines side lane lines of the vehicle based on the surrounding image, and while the vehicle travels in a default state (S301), identifies whether the vehicle travels along the side lane lines (S302), and identifies whether the steering torque changed by the user is greater than or less than the predetermined torque value (S303), and if the steering torque is greater than or equal to the predetermined torque value, determines that an intervention of the user has occurred, and disables autonomous driving (S304). If the steering torque is less than the predetermined torque value, the vehicle may continue to travel in the default state. The surrounding image may refer to an image or a picture of surroundings of the vehicle acquired through a camera. The side lane lines may refer to lines forming the current lane on which the vehicle is traveling.

Figure 6:
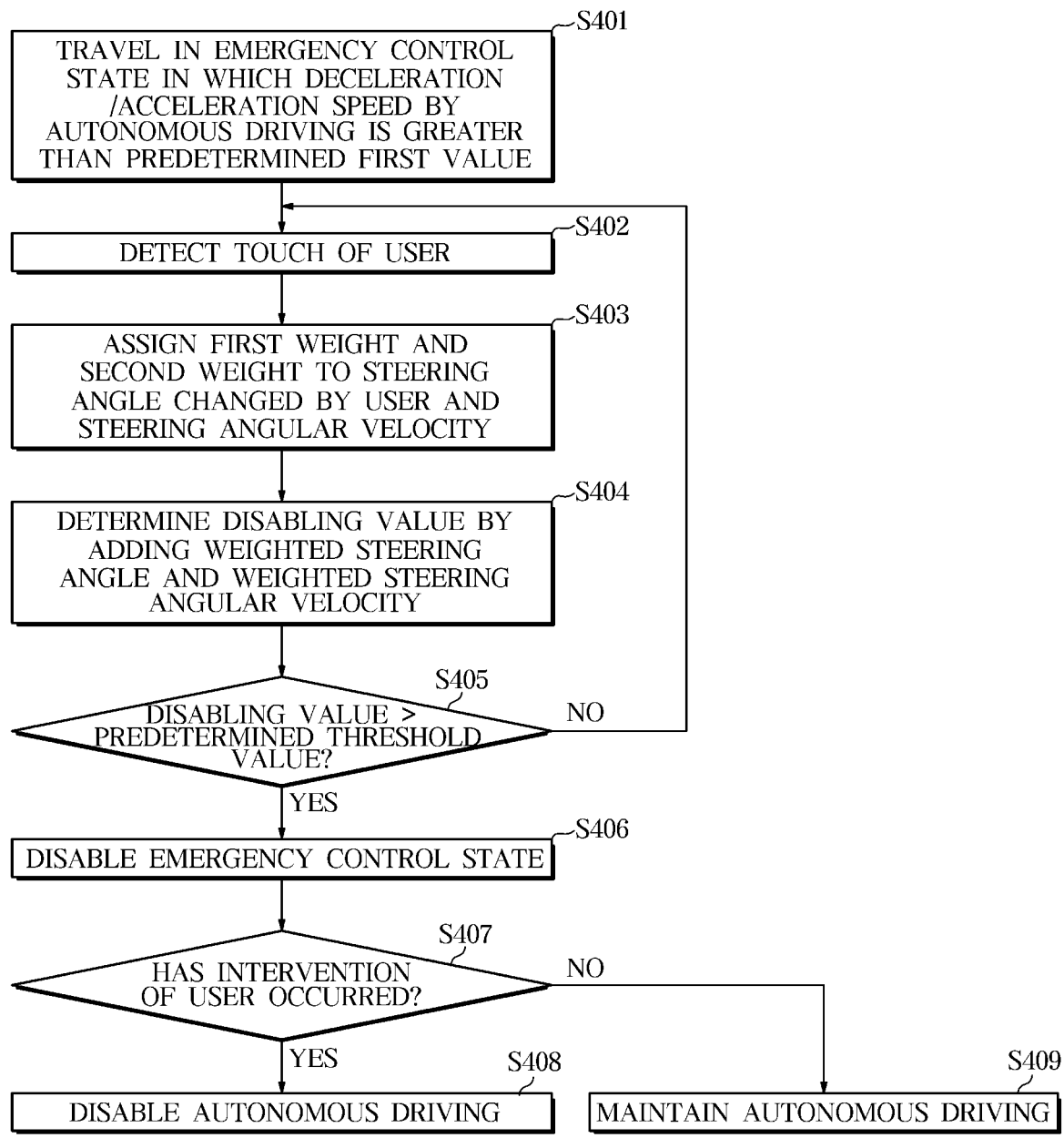
FIG. 6 is a flowchart according to an embodiment.

FIG. 6 is a flowchart according to an embodiment.

Referring to FIG. 6, the vehicle may travel in an emergency control state in which the deceleration/acceleration speed of the vehicle by autonomous driving is greater than the predetermined first value (S401). Thereafter, if the user touches the steering wheel, and the touch of the user is detected (S402), the first weight and the second weight may be assigned to the steering angle changed by the user and the steering angular velocity, respectively (S403). Thereafter, a disabling value may be determined by adding the weighted steering angle and the weighted steering angular velocity (S404). In this case, it is identified whether the disabling value is greater than or smaller than the predetermined threshold value (S405), and if the disabling value is smaller than or equal to the predetermined threshold value, the vehicle continues to travel in the emergency control state, and if the disabling value is greater than the predetermined threshold value, the emergency control state may be disabled (S406). Thereafter, it is identified whether an intervention of the user has occurred (S407), and if it is identified an intervention of the user has occurred, the autonomous driving is disabled (S408), and if it is identified that an intervention of the user has not occurred, the autonomous driving is maintained (S409).

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, the vehicle and the method of controlling the same can identify whether an intervention of a user occurs through a steering torque, a steering angle, and a steering angular velocity of a steering wheel during autonomous driving and a touch sensor to disable autonomous driving.

Although embodiments of the present disclosure have been described for illustrative purposes, those skilled in the art will appreciate that various modifications, additions and substitutions are possible, without departing from the scope and spirit of the disclosure.

What is claimed is:

1. A vehicle comprising:
a steering wheel;
a first sensor device configured to detect a steering torque of the steering wheel, a steering angle of the steering wheel, and a steering angular velocity of the steering wheel;
a second sensor device configured to detect a touch of a user applied to the steering wheel;
and
a controller configured to, while the vehicle travels in an emergency control state in which a deceleration/acceleration speed of the vehicle is greater than a predetermined first value during autonomous driving, if the touch of the user on the steering wheel is detected through the second sensor device, assign a first weight to the steering angle changed by the user, assign a second weight to the steering angular velocity, and determine a disabling value based on the steering angle assigned the first weight and the steering angular velocity assigned the second weight;
if the disabling value is greater than or equal to a predetermined threshold value, disable the emergency control state, and if the steering torque changed by the user is greater than or equal to a predetermined torque value, identify that an intervention of the user has occurred; and
if the intervention of the user is identified as having occurred, disable the autonomous driving.

2. The vehicle of claim 1, wherein the controller is configured to:
while the vehicle travels in a default state in which the deceleration/acceleration speed of the vehicle is less than the predetermined first value with the driving device being controlled by autonomous driving, if the steering torque changed by the user is greater than or equal to the predetermined torque value, identify that the intervention of the user has occurred, and disable the autonomous driving.

3. The vehicle of claim 2, further comprising a third sensor device configured to acquire distance information from another vehicle,
wherein the controller is configured to:
while the vehicle travels in the default state, if a distance between the vehicle and the other vehicle is greater than or equal to a predetermined interval based on the distance information, and the steering torque changed by the user is greater than or equal to the predetermined torque value, identify that the intervention of the user has occurred, and disable the autonomous driving.

4. The vehicle of claim 2, further comprising a camera configured to acquire a surrounding image of the vehicle,
wherein the controller is configured to determine side lane lines of the vehicle based on the surrounding image; and
while the vehicle travels in the default state in the side lane lines, if the steering torque changed by the user is greater than or equal to the predetermined torque value, identify that the intervention of the user has occurred, and disable the autonomous driving.

5. The vehicle of claim 1, further comprising an inputter configured to receive a command input by a user, wherein the inputter includes a button, a switch, a pedal, a keyboard, a mouse, a track-ball, a lever, a handle, a stick, or a touch screen panel; and wherein the controller is configured to set the first weight, the second weight, or the predetermined threshold value based on the command of the user being input through the inputter.

6. The vehicle of claim 1, further comprising:

a storage configured to store response information of the user and characteristic information of the vehicle, wherein the controller is configured to determine the first weight and the second weight based on the response information of the user and the characteristic information of the vehicle.

7. The vehicle of claim 1, wherein the controller is configured to normalize the steering angle changed by the user and the steering angular velocity, and assign the first weight to the normalized steering angle, and assign the second weight to the normalized steering angular velocity.

8. The vehicle of claim 7, wherein the first weight and the second weight are determined to have a sum equal to 1.

9. A method of controlling a vehicle, the method comprising:

detecting, by a first sensor device, a steering torque of the steering wheel, a steering angle of the steering wheel, and a steering angular velocity of a steering wheel;

detecting, by a second sensor device, a touch of a user applied to the steering wheel;

while the vehicle travels in an emergency control state in which a deceleration/acceleration speed of the vehicle is greater than a predetermined first value during autonomous driving, if the touch of the user on the steering wheel is detected through the second sensor device, assigning a first weight to the steering angle changed by the user, assigning a second weight to the steering angular velocity, and determining a disabling value based on the steering angle assigned the first weight and the steering angular velocity assigned the second weight;

if the disabling value is greater than or equal to a predetermined threshold value, disabling the emergency control state, and if the steering torque changed by the user is greater than or equal to a predetermined torque value, identifying that an intervention of the user has occurred; and if the intervention of the user is identified as having occurred, disabling the autonomous driving.

10. The method of claim 9, further comprising, while the vehicle travels in a default state in which the deceleration/acceleration speed of the vehicle is less than the predetermined first value with the driving device being controlled by autonomous driving, if the steering torque changed by the user is greater than or equal to the predetermined torque value, identifying that the intervention of the user has occurred, and disabling the autonomous driving.

11. The method of claim 10, wherein the disabling of the autonomous driving includes, while the vehicle travels in the default state, if a distance between the vehicle and the other vehicle is greater than or equal to a predetermined interval based on distance information acquired through a third sensor device, and the steering torque changed by the user is greater than or equal to the predetermined torque value, identifying that the intervention of the user has occurred, and disabling the autonomous driving.

12. The method of claim 10, wherein disabling the autonomous driving includes:

determining side lane lines of the vehicle based on a surrounding image of the vehicle acquired through a camera; and while the vehicle travels in the default state in the side lane lines, if the steering torque changed by the user is greater than or equal to the predetermined torque value, identifying that the intervention of the user has occurred, and disabling the autonomous driving.

13. The method of claim 9, further comprising setting the first weight, the second weight, or the predetermined threshold value based on a command of the user being input through an inputter:

wherein the inputter includes a button, a switch, a pedal, a keyboard, a mouse, a track-ball, a lever, a handle, a stick, or a touch screen panel.

14. The method of claim 9, further comprising setting the first weight and the second weight based on response information of the user and characteristic information of the vehicle stored through the storage.

15. The method of claim 9, wherein assigning the first weight to the steering angle changed by the user and assigning the second weight to the steering angular velocity includes:

normalizing the steering angle changed by the user and the steering angular velocity, and assigning the first weight to the normalized steering angle, and assigning the second weight to the normalized steering angular velocity.

16. The method of claim 15, wherein determining the first weight and the second weight includes determining the first weight and the second weight to have a sum equal to 1.

* * * * *